(12) United States Patent
Li et al.

(10) Patent No.: US 10,454,607 B2
(45) Date of Patent: Oct. 22, 2019

(54) MODE DIVISION MULTIPLEXING SYSTEMS AND METHODS USING A RECTANGULAR-CORE OPTICAL FIBER

(71) Applicant: Corning Incorporated, Corning, NY (US)

(72) Inventors: Ming-Jun Li, Horseheads, NY (US); Gaozhu Peng, Horseheads, NY (US); Jeffery Scott Stone, Addison, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/880,674

(22) Filed: Jan. 26, 2018

(65) Prior Publication Data

US 2018/0241496 A1 Aug. 23, 2018

Related U.S. Application Data

(60) Provisional application No. 62/462,485, filed on Feb. 23, 2017.

(51) Int. Cl.
*H04J 14/04* (2006.01)
*H04J 14/00* (2006.01)
(Continued)

(52) U.S. Cl.
CPC ............ *H04J 14/005* (2013.01); *G02B 6/021* (2013.01); *G02B 6/02004* (2013.01);
(Continued)

(58) Field of Classification Search
CPC .... H04B 10/2581; H04B 10/25; H04B 10/50; H04B 10/60; H04J 14/04; H04J 14/005;
(Continued)

(56) References Cited

U.S. PATENT DOCUMENTS 4,871,221 A * 10/1989 Imoto ................ G02B 6/12007
385/130
7,120,340 B2 * 10/2006 Berkey ............. C03B 37/01217
385/123

(Continued)

OTHER PUBLICATIONS

Mode conversion in rectangular-core optical fibers Bullington et al. Nov. 2011 (Year: 2011).*

(Continued)

*Primary Examiner* — Hibret A Woldekidan
(74) *Attorney, Agent, or Firm* — John P. McGroarty (57) ABSTRACT

A mode division multiplexing system that includes a transmitter system, a receiver system and an optical link that optically connects the transmitter and receiver systems. The optical link includes a rectangular-core optical fiber having a rectangular core with a short dimension and a long dimension. The rectangular-core optical fiber supports only a single mode in the short dimension and multiple modes in the long dimension. A method of transmitting optical signals includes converting single mode optical signals to respective multimode optical signals each having a select spatial mode as defined by the rectangular-core optical fiber. The multimode optical signals are multiplexed and transmitted from the transmitter system to the receiver system over the rectangular-core optical fiber where the multimode optical signals are demultiplexed and converted back to single mode optical signals, which are then detected by respective receivers. A rectangular-core optical fiber is also disclosed.

19 Claims, 6 Drawing Sheets

(51) Int. Cl.
  *G02B 6/293* (2006.01)
  *H04B 10/60* (2013.01)
  *H04B 10/50* (2013.01)
  *H04B 10/2581* (2013.01)
  *G02B 6/42* (2006.01)
  *G02B 6/02* (2006.01)

(52) U.S. Cl.
  CPC ......... *G02B 6/2938* (2013.01); *G02B 6/4246* (2013.01); *H04B 10/2581* (2013.01); *H04B 10/50* (2013.01); *H04B 10/60* (2013.01); *H04J 14/04* (2013.01)

(58) Field of Classification Search
  CPC .............. G02B 6/0288; G02B 6/02047; G02B 6/0281; G02B 6/02004; G02B 6/021; G02B 6/2938; G02B 6/4246; G02B 6/14
  USPC ................................ 398/44, 140–144, 48, 79
  See application file for complete search history.

(56) References Cited

U.S. PATENT DOCUMENTS

| | | | | |
|---|---|---|---|---|
| 7,242,834 B2* | 7/2007 | Lee | ................... | G02B 6/02028 385/123 |
| 7,496,244 B2* | 2/2009 | Berkey | ............. | C03B 37/01217 359/333 |
| 9,503,186 B2* | 11/2016 | Kawanishi | .............. | H04J 14/04 |
| 9,874,682 B2* | 1/2018 | Matsumoto | ........... | G02F 1/1335 |
| 9,998,253 B2* | 6/2018 | Colbourne | .............. | G02B 6/356 |
| 2007/0223552 A1* | 9/2007 | Muendel | ............ | G02B 6/12004 372/50.12 |
| 2008/0205838 A1* | 8/2008 | Crippa | ................... | G02B 6/124 385/126 |
| 2011/0026879 A1* | 2/2011 | Popovic | ................. | G02B 6/107 385/28 |
| 2011/0280532 A1* | 11/2011 | Sasaoka | ............ | C03B 37/01211 385/123 |
| 2012/0121220 A1* | 5/2012 | Krummrich | ....... | H04B 10/2581 385/28 |
| 2015/0340835 A1* | 11/2015 | Sridharan | ........... | H01S 3/10007 359/341.1 |

OTHER PUBLICATIONS

Kubota et al; "Three-Mode Multi/Demultiplexing Experiment Using PLC Mode Multiplexer and Its Application to 2+1 Mode Bi-Directional Optical Communication"; IEICE Electronics Express, vol. 10, No. 12, p. 1-6; (2013).

Sridharan et al; "Mode-Converters for Rectangular-Core Fiber Amplifiers to Achieve Diffraction-Limited Power Scaling"; Optics Express, vol. 20, No. 27; pp. 28792-28800 (2012).

* cited by examiner

ND METHODS USING A
MODE DIVISION MULTIPLEXING SYSTEMS AND METHODS USING A RECTANGULAR-CORE OPTICAL FIBER

This application claims the benefit of priority under 35 U.S.C. § 119 of U.S. Provisional Application Ser. No. 62/462,485 filed on Feb. 23, 2017 the content of which is relied upon and incorporated herein by reference in its entirety.

FIELD

The present disclosure relates to mode division multiplexing systems and in particular relates to mode division multiplexing systems and methods using a rectangular-core optical fiber.

BACKGROUND

Optical telecommunication systems rely on various types of multiplexing of optical signals onto a common transmission optical fiber to increase the amount of information that can be transmitted over the transmission optical fiber. The types of multiplexing used include wavelength division multiplexing (WDM), polarization division multiplexing (PDM), frequency division multiplexing (FDM), time division multiplexing (TDM), space division multiplexing (SDM) and mode division multiplexing (MDM).

Mode division multiplexing (MDM) involves combining optical signals (data streams) in different spatial modes supported by a multimode fiber (MMF) or a few-mode fiber (FMF). Conventional MDM systems employ FMFs that have a round core that support two-dimensional mode distributions along both radial and azimuthal directions. This requires the MDM system to have two-dimensional mode converters to couple the modes into and out of the transmission optical fiber. The complexity of these mode converters increases with the number of modes used, making the MDM system complex and expensive.

SUMMARY

An aspect of the disclosure is a mode division multiplexing system that includes a transmitter system and a receiver system. The transmitter system has first mode conditioners adapted to convert first single mode optical signals to respective multimode optical signals having respective spatial modes, and a mode multiplexer optically connected to the first mode conditioners and adapted to multiplex the multimode optical signals. The receiver system has a mode demultiplexer adapted to demultiplex the multiplexed multimode optical signals and having second mode conditioners optically coupled to the mode demultiplexer, the second mode conditioners adapted to convert the multimode optical signals into respective second single mode optical signals. The mode division multiplexing system also includes an optical link that optically connects the transmitter system and receiver system. The optical link includes at least one rectangular-core optical fiber having a rectangular core with a short dimension and a long dimension, wherein the rectangular-core optical fiber supports the spatial modes, and wherein the spatial modes are defined by only a single spatial mode in the short dimension and N spatial modes in the long dimension, wherein N≥2.

Another aspect of the disclosure is a mode division multiplexing system that includes a transmitter system, a receiver system and at least one rectangular-core optical fiber that connects the transmitter system and the receiver system. The transmitter system generates multimode optical signals at an operating wavelength λ, with each multimode optical signal having a select spatial mode. The receiver system is adapted to receive and process the multimode optical signals. The at least one rectangular-core optical fiber includes: i) a rectangular core having a relative refractive index $\Delta_1$ in the range from 0.2% to 1% when the operating wavelength λ=1550 nm, a short dimension h in the range of 5 μm to 25 μm and a long dimension of width w in the range of 10 μm to 100 μm, subject to the condition that 2≤w/h≤10; ii) a cladding surrounding the core and having a relative refractive index $\Delta_2$=0; and iii) wherein the at least one optical fiber defines the select spatial modes of the multimode optical signals, and wherein the select spatial modes comprise only a single spatial mode in the short dimension and N spatial modes in the long dimension at the operating wavelength λ, wherein N≥2.

Another aspect of the disclosure is a method of transmitting optical signals from a transmitter system to a receiver system. The method includes: at the transmitter system, converting first single mode optical signals into respective multimode optical signals, with each multimode optical signal having a select spatial mode as defined by a rectangular-core optical fiber having a rectangular core with a short dimension and a long dimension, wherein the rectangular-core optical fiber supports only a single spatial mode in the short dimension and N spatial modes in a long dimension, wherein N≥2; transmitting the multimode optical signals over the rectangular-core optical fiber from the transmitter system to the receiver system; and performing at the receiver system mode division demultiplexing of the multimode optical signals and converting each multimode optical signal into a corresponding second single mode optical signal and then detecting the second single mode optical signals at respective receivers.

Another aspect of the disclosure is a rectangular-core optical fiber that includes: a rectangular core having a refractive index $n_1$, a short dimension h, a long dimension w and an outer surface; and a cladding that surrounds the outer surface of the rectangular core and having a refractive index $n_2 < n_1$ such that rectangular core supports only a single spatial mode in the short dimension and a number N≥2 of multiple spatial modes in the long dimension at an operating wavelength λ and a cutoff wavelength $\lambda_c$ for the short dimension as defined by the range 1150 nm≤$\lambda_c$<λ.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and the operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

A parameter described as being "in the range from X to Y" includes the values of X and Y unless otherwise expressly stated in words or by using the "greater than" symbol ">" or the "less than" symbol "<".

The term "relative refractive index" as used herein is defined as:

$$\Delta(r)=\Delta=[n(r)^2-n_{REF}^2)]/2n_1^2,$$

where $n_1$ is the core refractive index, n(r) is the refractive index at a distance r from the core center in the short or long dimension direction unless otherwise specified. For the rectangular core disclosed herein, the radial coordinate $r=(x^2+y^2)^{1/2}$ has a different range definition in the x-direction and the y-direction. Thus, for the core, $r=y \leq h/2$ in the short dimension (y-direction) and $r=x \leq w/2$ in the long dimension (x-direction). The relative refractive index Δ is defined at 1550 nm unless otherwise specified. In one aspect, the reference index $n_{REF}$ is that for silica glass. In another aspect, $n_{REF}$ is the maximum refractive index of the cladding, which is denoted $n_2$.

As used herein, the relative refractive index is represented by $\Delta_n$ wherein n=1 for the core and n=2 for the cladding. In the discussion below, $n_{REF}=n_2$ so that $\Delta_2=0$. The values of $\Delta_n$ are given in units of "%," unless otherwise specified. The $\Delta_n$ is also referred to herein as the "relative refractive index profile." Unless otherwise noted, the relative refractive index profile is that for the short dimension of the rectangular core unless otherwise noted. In an example, the value for $\Delta_1$ is the same for the short and long dimensions of the core.

The term "dopant" as used herein refers to a substance that changes the relative refractive index of glass relative to pure (undoped) $SiO_2$. One or more other substances that are not dopants may be present in the core of the optical fiber disclosed herein to define a positive value for $\Delta_1$, i.e., the core relative refractive index. A dopant can be an index-increasing dopant or an index-decreasing dopant, and such dopants are well known in the art of optical fibers.

MDM System

Figure 1:
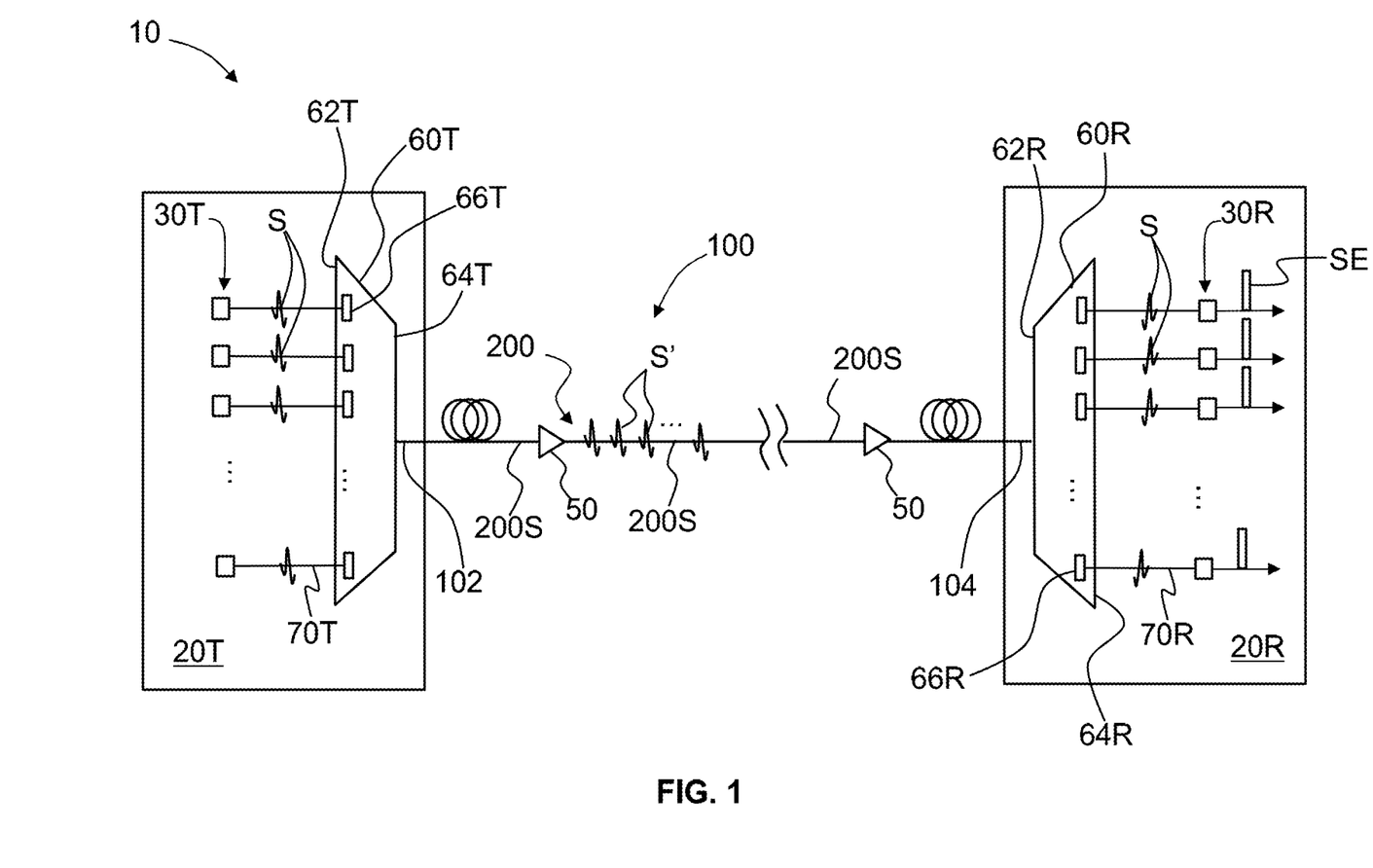
FIG. 1 is a schematic diagram of an example MDM system that employs the rectangular-core optical fiber disclosed herein.

FIG. 1 is a schematic diagram of an example MDM system 10 as disclosed herein. The MDM system 10 includes a transmitter system 20T, a receiver system 20R and an optical fiber link 100 that optically connects the transmitter and receiver systems. The optical fiber link 100 includes at least one section 200S of a rectangular-core optical fiber (RCOF) 200, which is discussed in greater detail below. The optical fiber link 100 has an input end 102 optically connected to the transmitter system 20T and an output end 104 optically connected to the receiver system 20R. In an example, the input and output ends 102 and 104 of the optical fiber link 100 define input and output ends of a single RCOF 200. In an example, the optical fiber link 100 can include multiple sections 200S of the RCOF 200, with optical amplifiers 50 operably arranged between adjacent sections 200S. The RCOF 200 is configured to support select spatial modes and thus defines the select spatial modes formed by the transmitter system 20T as described below. In an example, the RCOF 200 comprises a FMF.

The transmitter system 20T includes transmitters 30T that generate and transmit optical signals S each having the same wavelength λ, referred to herein as the "operating wavelength." In other embodiments, the optical signals S can have different operating wavelengths. In an example, the optical signals S comprise data signals for different channels. The transmitter system 20T also includes a mode multiplexer 60T having an input end 62T and an output end 64T. Each transmitter 30T is optically connected to the input end 62T of the mode multiplexer 60T by a single mode waveguide 70T, which in an example can be an optical fiber. The single mode waveguide 70T can also be a rectangular (e.g., slab) waveguide, i.e., wherein the core (not shown) has a rectangular cross-sectional shape.

By definition, each optical signal S of operating wavelength λ travels in the single mode waveguide 70T in a single spatial mode, and in particular travels in the fundamental mode of the single mode waveguide 70T when the operating wavelength is greater than the cutoff wavelength $\lambda_c$, introduced and discussed below. The optical signals S at this point are thus referred to as single mode optical signals S.

The transmitter system 20T also includes mode conditioners 66T. Each mode conditioner 66T is configured to receive one of the single mode optical signals S traveling in the single mode waveguide 70T and form therefrom a corresponding optical signal S' that has one of the select spatial modes supported by the RCOF 200. Since the select spatial modes include both the fundamental mode and higher-order modes (i.e., not only the fundamental mode), these optical signals S' are referred to herein as multimode optical signals S' for convenience. In an example, the mode conditioners 66T can comprise respective phase plates. In other examples, the mode conditioners 66T can also comprise spatial light modulators, holograms, photonic lanterns, integrated waveguide devices or like optical components, or a combination of such components. In an example, the mode conditioners 66T can be incorporated into the mode multiplexer 60T as shown. In another example, the mode conditioners 66T can reside outside of the mode multiplexer 60T between the transmitters 30T and the input end 62T of the mode multiplexer 60T. The output end 64T of the mode multiplexer 60T is optically coupled to the input end 102 of the optical fiber link 100. In an example, each of the select spatial modes defines a data channel transmitted over the optical fiber link 100.

The receiver system 20R is configured to receive and process the multimode optical signals S' that travel over the optical fiber link 100 from the transmitter system 20T to the receiver system. The receiver system 20R has a mode demultiplexer 60R with an input end 62R and an output end 64R. The output end 104 of the optical fiber link 100 is optically connected to the input end 62R of the mode demultiplexer 60R. The mode demultiplexer 60R is configured to receive and separate the optical signals S' by their spatial modes.

The receiver system 20R also includes mode conditioners 66R each configured to receive one of the optical signals S' having a select spatial mode and convert it into a single mode optical signal S. In an example, the mode conditioners 66R can comprise phase plates. In other examples, the mode conditioners 66R can also comprise spatial light modulators, holograms or like optical components, photonic lanterns, integrated waveguide devices or a combination of such components. In an example, the mode conditioners 66R can be incorporated into the mode demultiplexer 60R as shown. In another example, the mode conditioners 66R can reside outside of the mode demultiplexer 60R adjacent the output end 64R.

The receiver system 20R also includes receivers 30R that are optically connected to the output end 64R of the mode demultiplexer 60R by respective single mode waveguides 70R, which in an example can be an optical fiber. The single mode waveguide can also be a rectangular (e.g., slab) waveguide, i.e., wherein the core (not shown) has a rectangular cross-sectional shape.

In the general operation of the MDM system 10, the transmitters 30T each emit different single mode optical signals S (e.g., different data signals) at the operating wavelength λ. These single mode optical signals S can be referred to as the first single mode optical signals. The first single mode optical signals S travel over the respective single mode waveguides 70T to the input end 62T of the mode multiplexer 60T. The mode conditioners 66T convert each first single mode optical signal S into a multimode optical signal S' having one of the select spatial modes of the RCOF 200. The mode multiplexer 60T then receives and multiplexes the multimode optical signals S' into the corresponding spatial modes of the RCOF 200.

The multimode optical signals S' then travel over the optical fiber link 100 in the different spatial modes of the RCOF 200 to the receiver system 20R, where they are received at the input end 62R of the mode demultiplexer 60R. The multimode optical signals S' are then separated by the mode demultiplexer 60R by their individual spatial modes. The individual multimode optical signals S' are converted by the respective mode converting elements 66R into second single mode optical signals S. The second single mode optical signals S then travel over respective ones of the single mode waveguides 70R to the corresponding receivers 30R. The receivers 30R can then convert the second single mode optical signals S into respective electrical signals SE.

The transmitter system 20T and receiver system 20R can be made using different designs and components, for example the aforementioned phase plates for the mode conditioners 66T and 66R, as well as with free-space coupling optics, fiber lanterns, and integrated waveguide devices. As noted above, waveguide-based components for the single mode waveguides 70T and 70R are particularly suitable for use with the RCOF 200, because the core shape of the waveguide-based components can be made similar to the shape of rectangular core of the RCOF 200 to facilitate optical coupling. With proper fiber and waveguide designs, the coupling loss between the RCOF 200 and the rectangular single mode waveguides 70T and 70R can be minimized. In addition, photonics integration technology can make compact transmission and receiver systems 20T and 20R together with optical switches, which are suitable for MDM switching in optical interconnect and MDM applications.

RCOF

Figure 2A:
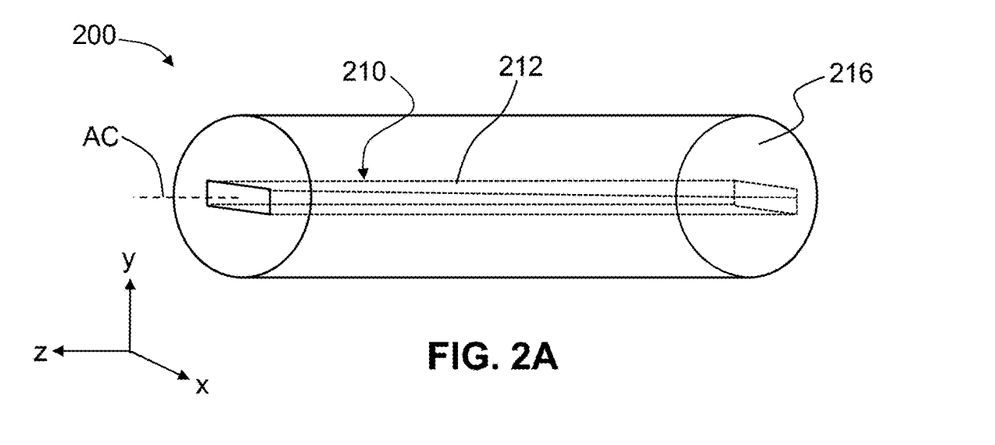
FIG. 2A is side elevated view and FIG. 2B is an x-y cross-sectional view of a section of an example rectangular-core optical fiber as disclosed herein.
Figure 2B:
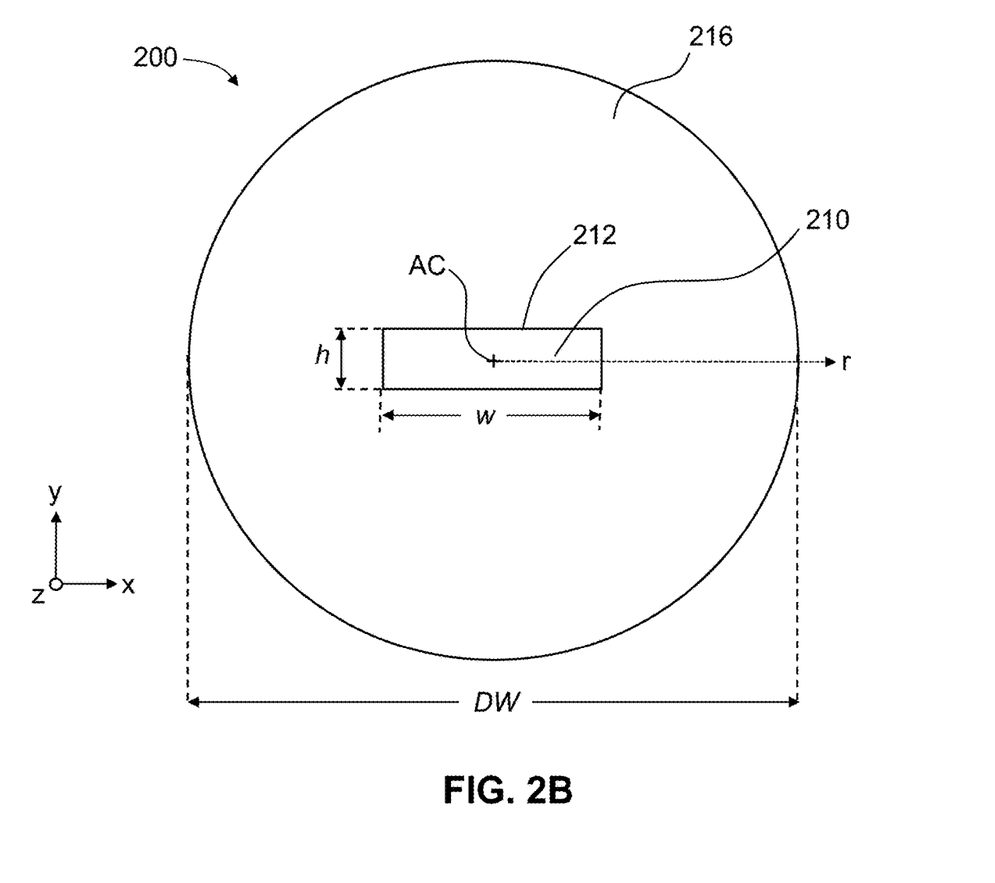

FIG. 2A is side elevated view and FIG. 2B is an x-y cross-sectional view of a section 200 of an example RCOF 200 as disclosed herein. A radial coordinate r is shown in FIG. 2B. The RCOF 200 has a central axis AC and a core 210 having an outer surface 212. In an example, the core 210 is centered on the central axis AC. The RCOF 200 also has cladding 216 that surrounds the outer surface 212 of the core 210. The core 210 has a refractive index $n_1$ and has a rectangular cross-sectional shape with a short dimension ("height") h ("height") in the y-direction and a long dimension ("width") w in the x-direction, wherein 2h≤w. In one example, the width w and height h define a ratio w/h in the range 2≤w/h≤10, while in another example the ratio w/h is in the range 4≤w/h≤8.

The cladding 216 has a refractive index $n_2 < n_1$ and can have any cross-sectional shape, for example the round cross-sectional shape as shown. The cladding 216 has an outer dimension (e.g., a diameter) DW. The RCOF 200 is configured (e.g., has a relative refractive index profile $\Delta_n$) to support only a single mode along the short dimension (y-direction) of the core 210 and to support multiple modes (e.g., a few modes, such as between two and ten modes) along the long dimension (x-direction). In an example, the core 210 comprises doped $SiO_2$ with an index-raising dopant such as $GeO_2$, while the cladding 216 comprises undoped $SiO_2$. In another example, the core 210 comprises essentially pure $SiO_2$, while the cladding 216 comprises doped $SiO_2$ with an index-decreasing dopant such as F.

The single mode condition of the RCOF 200 is denoted by V and can be expressed approximately using the following equation, wherein h is the height of the rectangular core 210 and λ is the operating wavelength:

$$V = \frac{2\pi}{\lambda} h \sqrt{n_1^2 - n_2^2} < \pi.$$

The cutoff wavelength $\lambda_c$ is the wavelength above which the fiber supports only a single mode in the short dimension and is given by:

$$\lambda_c = 2h\sqrt{n_1^2 - n_{2hu2}^2},$$

wherein the cutoff wavelength $\lambda_c < \lambda$, and the ranges on the cutoff wavelength $\lambda_c$ set forth herein are subject to this condition, namely that the operating wavelength $\lambda$ be greater than the cutoff wavelength $\lambda_c$.

For operating wavelengths $\lambda$ in the optical fiber transmission window (range) from 1310 nm to 1550 nm, the cutoff wavelength $\lambda_c$ is preferably in the range of 1150 nm to 1300 nm and even more preferably in the range of 1200 nm to 1300 nm. If the cutoff wavelength $\lambda_c$ is below 1150 nm, the bending loss will be relatively high and generally unsuitable for MDM applications. For example, a rectangular-core optical fiber designed for fiber laser operation at 1060 nm would generally not suitable for MDM applications that use an operating wavelength $\lambda$ in the range from 1310 nm to 1550 nm or 1450 nm to 1650 nm.

For example, MDM applications that use an operating wavelength of $\lambda=1550$ nm, the cutoff wavelength $\lambda_c$ can be in the range of 1450 nm to 1530 nm, or more preferably in the range of 1450 nm to 1500 nm. In an example, the cutoff wavelength $\lambda_c$ is greater than 1150 nm to ensure a good bending performance when the fiber is bent in the short dimension.

Figure 3A:
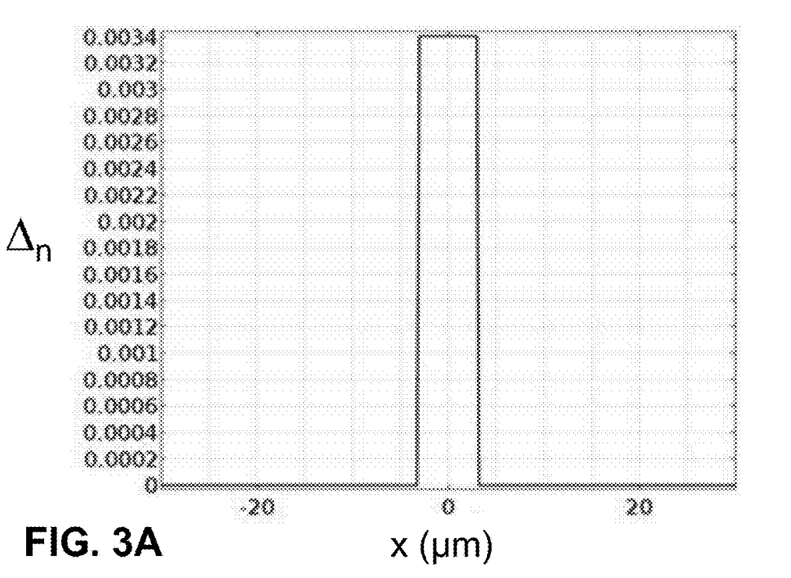
FIGS. 3A and 3B are plots of the relative refractive index $\Delta_n$ versus the position in the x-direction in microns (μm) (FIG. 3A) and the position in the y-direction (μm) (FIG. 3B) for an example rectangular-core optical fiber as disclosed herein.
Figure 3B:
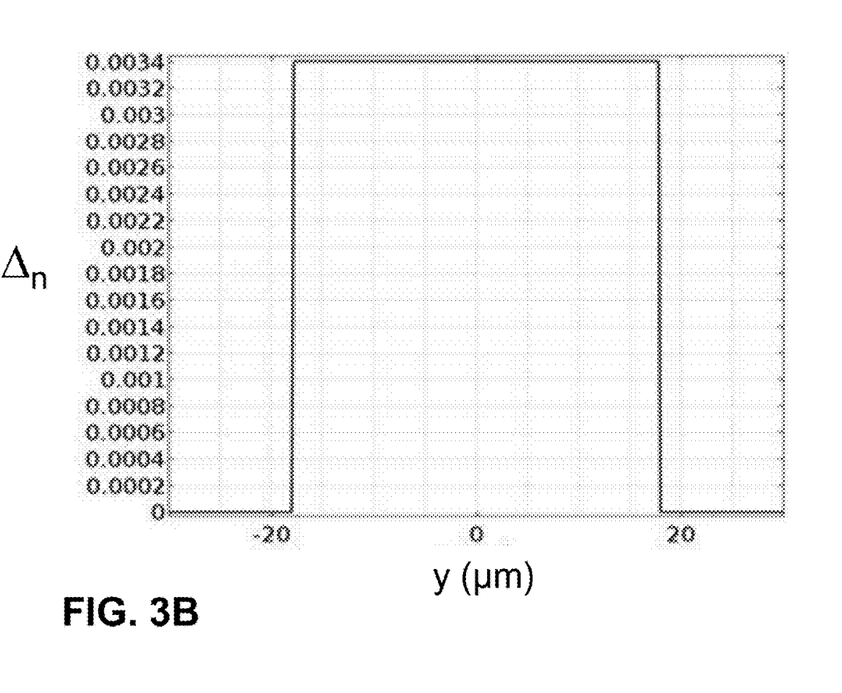

FIGS. 3A and 3B are plots of the relative refractive index $\Delta_n$ versus the position in the x-direction in microns (μm) (FIG. 3A) and the position in the y-direction (μm) (FIG. 3B) for an example of the RCOF 200 disclosed herein. The plots of FIGS. 3A and 3B show example relative refractive profiles in the x-direction and the y-direction for an example RCOF 200 having a core height h=6 μm and a core width w=36 μm.

In an example, the core relative refractive index $\Delta_1$ is in the range from 0.2% to 1%, and more preferably is in the range of 0.3% to 0.6% or from 0.3% to 0.5%. Also in an example, the width w is in the range from 10 μm to 100 μm or in the range from 12 μm to 50 μm while the height h is in the range from 5 μm to 25 μm or in the range from 5 μm to 10 μm. Also in an example, the cladding diameter DW is between 80 μm to 150 μm, and in a particular example is 125 μm.

Table 1 below sets forth six example designs for the RCOF 200 disclosed herein. In the table below, $\lambda$ is the operating wavelength and N is the number of modes supported in the long dimension (x-direction), wherein N≥2. The short dimension h (y-direction) is understood as supporting a single mode only.

TABLE 1

| EXAMPLE | λ (nm) | $\Delta_1$ (%) | w (μm) | h (μm) | w/h | N | $\lambda_c$ (nm) |
|---|---|---|---|---|---|---|---|
| Example 1 | 1550 | 0.24 | 48.0 | 7.7 | 6 | 5 | 1541 |
| Example 2 | 1550 | 0.34 | 36.0 | 6.0 | 6 | 5 | 1429 |
| Example 3 | 1550 | 0.34 | 58.0 | 5.8 | 10 | 7 | 1381 |
| Example 4 | 1550 | 0.34 | 12.0 | 6.0 | 2 | 2 | 1429 |
| Example 5 | 1310 | 0.34 | 33.6 | 5.4 | 6 | 5 | 1286 |
| Example 6 | 1550 | 0.45 | 44.8 | 5.6 | 8 | 7 | 1534 |

The plots set forth in FIGS. 3A and 3B are for Example 2, which has a core relative refractive index $\Delta_1=0.34$ at an operating wavelength $\lambda=1550$ nm and a cladding diameter DW of 125 μm.

Figure 4A:
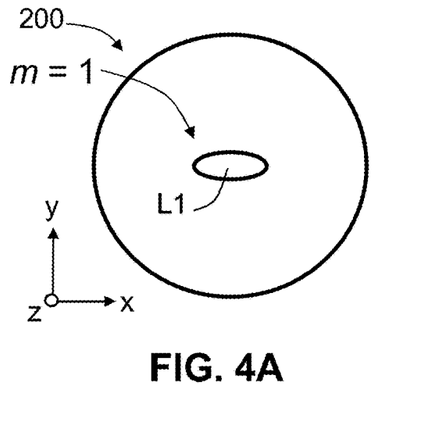
FIGS. 4A through 4E are schematic representations of the intensity distributions of the five different modes m (i.e., m=1 through N, where N=5) supported by an Example 2 of the rectangular-core optical fiber disclosed herein.
Figure 4B:
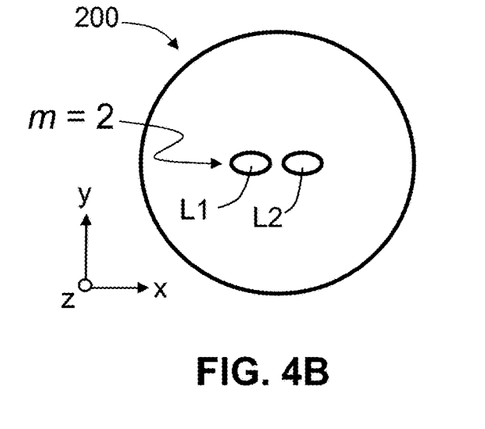
Figure 4C:
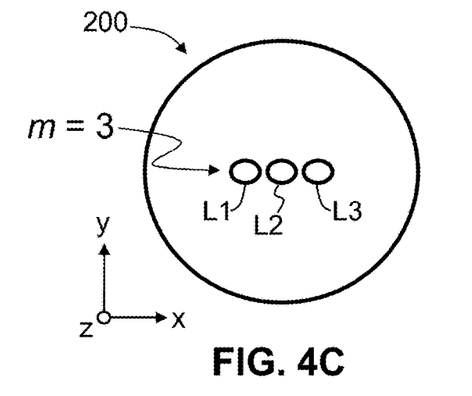
Figure 4D:
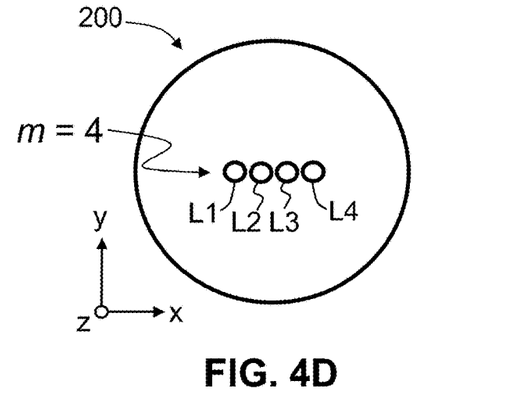
Figure 4E:
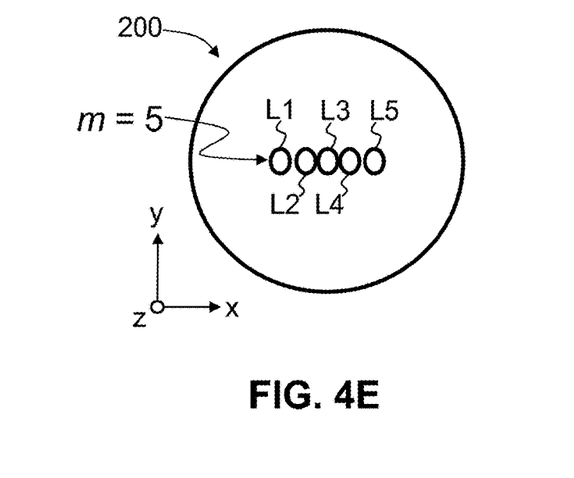

FIGS. 4A through 4E are schematic representations of the intensity distributions of the five different modes m (i.e., m=1 through N, where N=5) supported by the RCOF 200 of Example 2. FIG. 4A shows the fundamental mode m=1 that includes a single intensity lobe L1. FIG. 4B shows the second mode m=2, which includes two main intensity lobes L1 and L2 that lie along the long dimension of the core 210, i.e., along the x-axis. FIG. 4C shows the third mode m=3, which includes three main intensity lobes L1, L2 and L3 that lie along the x-axis. FIG. 4D shows the fourth mode m=4, which includes four main intensity lobes L1, L2, L3 and L4 that lie along the x-axis. FIG. 4E shows fifth mode m=5, which includes five main intensity lobes L1, L2, L3, L4 and L5 that lie along the x-axis.

It is noted that each mode m has two polarizations, namely transverse electric (TE) and transverse magnetic (TM), so that the total number N of modes m can be thought of as being for one of these polarizations only.

The total number N of modes supported by the RCOF 200 depends on the relative refractive index profile $\Delta_n$ in the short and long dimensions h and w, and in particular the core relative refractive index $\Delta_1$ and width w of the core 210, assuming that h is selected to support only a single mode m in the short dimension. Although only N=5 total modes m are illustrated in the six design examples, it is understood a larger number N of modes m can be designed by increasing the core relative refractive index and the core width w. In examples, 2≤N≤50, or 2≤N≤25, or 2≤N≤20 or 2≤N≤10, or 2≤N≤7, or 2≤N≤5.

The above Examples 1 through 6 are assumed to have perfect step refractive index profiles (and thus step relative refractive index profiles $\Delta_n$). It is understood that other types of refractive index profiles $\Delta_n$ can also be used, as well as slight variations in a step refractive index profiles and other profiles that arise from manufacturing limitations. In other examples, the refractive index profile can be graded in one of the x-direction and the y-direction, or grade in both the x-direction and the y-direction.

As can be seen in FIGS. 4A through 4E, an advantage of the RCOF fiber 200 disclosed herein is that the modes m all lie along a line, i.e., the x-direction. This greatly simplifies the design of the mode conditioners 66T and 66R since they only need to redistribute the light of a given single mode optical signal mainly in a single dimension (direction) rather than in two dimensions (directions).

Fabricating the RCOF

Figure 5A:
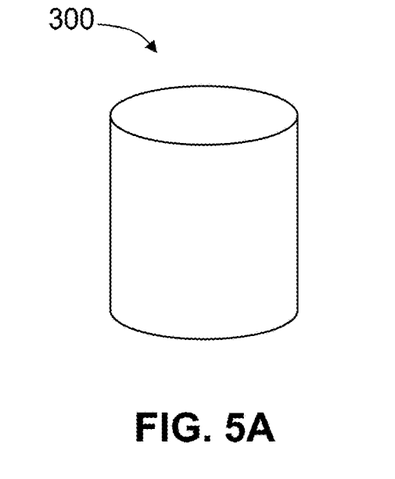
FIG. 5A is an elevated view of a glass block used as a starting point to form the preform used to form the rectangular-core optical fiber disclosed herein.

The RC-FMS 200 can be made using a drawing process, and in particular using an outside vapor deposition (OVD) process. With reference to FIG. 5A, in a fabrication study, a 5000 g SiO$_2$ soot blank 300 with soot density of about 0.385 g/cm$^3$ was fabricated and then pre-sintered in a consolidation furnace at 1270° C. for 3 hours in helium atmosphere to increase the density of the soot blank. After pre-sintering, the consolidated soot blank 300 had a density of about 0.9 g/cm$^3$ and a diameter of about 115 mm.

Figure 5B:
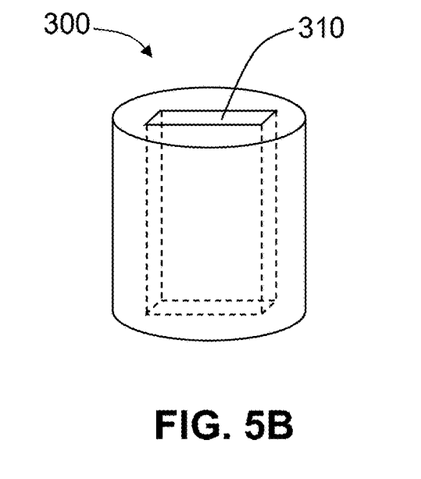
FIG. 5B shows the glass block of FIG. 5A with a rectangular hole.
Figure 5C:
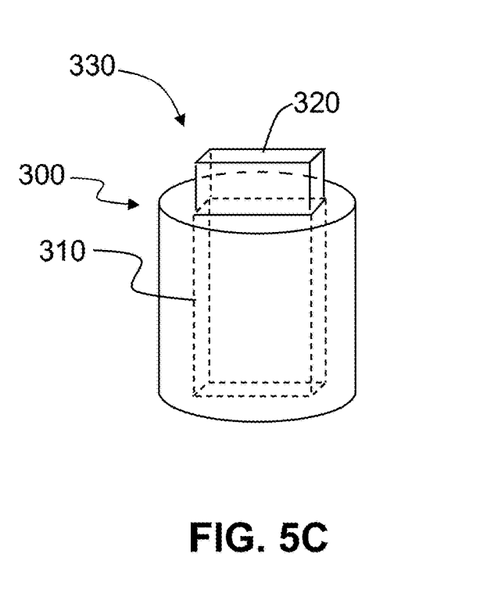
FIG. 5C shows the glass block of FIG. 5B with a rectangular glass block inserted into the rectangular hole to form a glass block assembly.
Figure 5D:
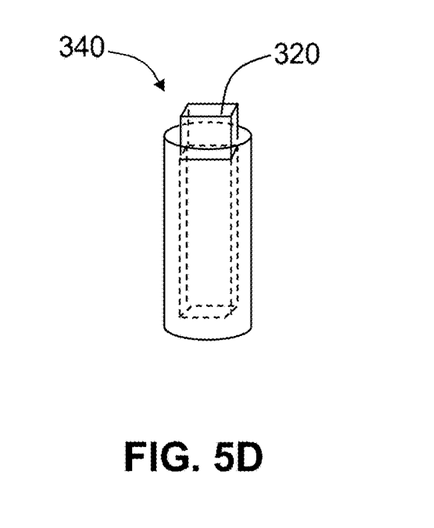
FIG. 5D shows the final glass preform as formed by consolidation and selective doping of the glass block assembly of FIG. 5C.

With reference now to FIG. 5B, a rectangular hole 310 having a height h'=10 mm and a width w'=44 mm was machined in the middle of the blank 300 to a depth of 15 cm. A pure SiO$_2$ glass rectangular block 320 was cut to slightly smaller dimensions than that of the machined rectangular hole 310 and inserted into the hole to form a glass block assembly 330 as shown in FIG. 5C. The glass block assembly 330 was then consolidated and selectively doped with F (fluorine) to create a final glass preform 340, as shown in FIG. 5D. The glass preform 340 has generally the same relative dimensions and shape as the RCOF 200 to be formed, but is much larger, e.g., 25X to 100X larger. The example glass preform 340 had a core relative refractive index $\Delta_1$ of about 0.3%.

The above example uses a pure silica core with a F-doped cladding. Alternatively, one can use a GeO$_2$ doped core with a pure silica cladding to construct a rectangular core preform 340 using the same process described above.

Forming the RCOF by Drawing

Figure 6:
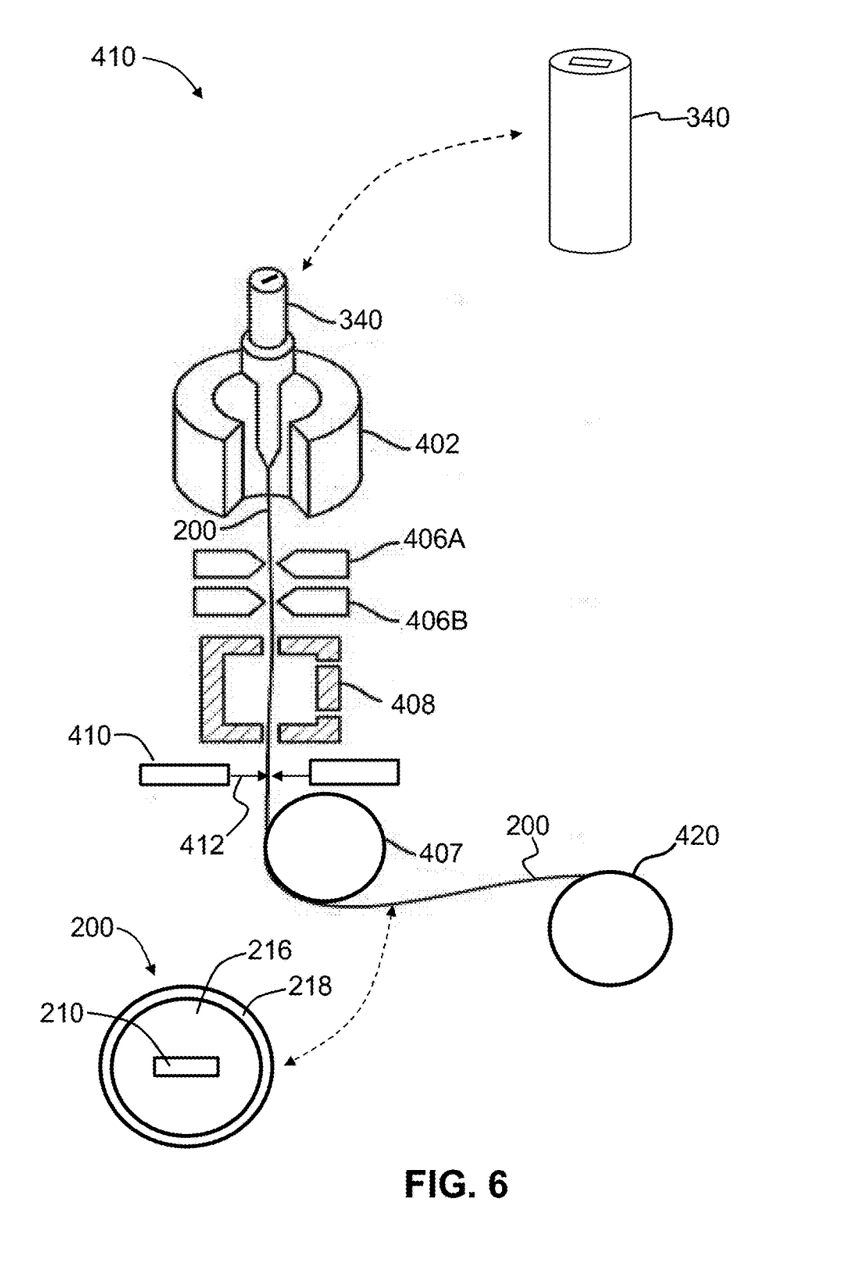
FIG. 6 is a schematic diagram of an example drawing system used to draw the glass preform of FIG. 5D to form the rectangular-core optical fiber as disclosed herein.

FIG. 6 is a schematic diagram of an example drawing system 400 used to draw the glass preform 340. The drawing system 400 may comprise a draw furnace 402 for heating the glass preform 340. The configuration of the glass preform 340 and the various drawing parameters (draw speed, temperature, tension, cooling rate, etc.) dictate the final form of RCOF 200.

In the fabrication process, the drawn glass preform 340 exits the draw furnace 402 and has the general form of the RCOF 200. After the RCOF 200 exits the draw furnace 402, its dimensions may be measured using non-contact sensors 406A and 4066B. Tension may be applied to RCOF 200 by a tensioning device 407, which can be any suitable tension-applying device or mechanism known in the art of optical fiber manufacturing.

After the dimensions and tension of the RCOF 200 are measured, the RCOF may be passed through a cooling mechanism 408 that provides slow cooling. The cooling mechanism 408 can be filled with a gas that facilitates cooling of the drawn RCOF 200 at a rate slower than cooling the fiber in air at ambient temperatures. Once the RCOF 200 exits the cooling mechanism 408, it can be coated at a coating station 410. The coating station 410 is configured to dispense or otherwise provide at least one polymer material 412 to form a polymer coating 218 (see close-up inset) about the cladding 216 to protect the RCOF 200. The final RCOF 200 can then be directed to and wound upon a spool 420 for storage.

EXAMPLE

A rectangular fiber was made using the process described above. First, a pure silica soot blank was made by using outside vapor deposition (OVD) process. The blank had 3500 g SiO$_2$ soot with soot density of about 0.385 g/cm$^3$. The blank was then pre-sintered in a consolidation furnace at 1270° C. for 3 hours in helium atmosphere to increase the density of the soot blank to about 0.9 g/cm$^3$ with a diameter of 90 mm. Then, a rectangular hole in the preform was machined with dimensions of 10 mm×44 mm. Second, another pure silica soot blank was made with about 3500 g soot with soot density of about 0.385 g/cm$^3$. The blank was consolidated in a chlorine and helium atmosphere around 1460° C. After consolidation, the glass was doped with about 2% of chlorine and an index delta of about 0.15% relative to pure silica. Then, the blank was cut to a rectangular shaped with dimensions about 9.5 mm×43.5 mm, slightly smaller than the rectangular hole in the first blank. Third, the rectangular shaped glass was inserted into the rectangular hole of the first blank to form a rectangular glass core and round soot cladding assembly. The assembled preform was then consolidated at 1460° C. with SF$_6$ gas to dope fluorine into the cladding. The index delta due to fluorine doping was about −0.4% relative to silica. The consolidated blank was redrawn to 13 mm diameter glass cane. The glass cane was overcladded with 1800 g silica soot using OVD process and consolidated to form the final preform. Finally, the preform was then drawn into fiber with 125 μm diameter.

The fiber had a core delta of about 0.55% relative to the fluorine doped inner cladding. The core width w=33 μm, and core height h=6.2 μm. The ratio w/h was 4.4. The fiber was characterized for modes that it could support. Results showed that the fiber had single mode in the short dimension and had N=5 modes in the long dimension.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A mode division multiplexing system, comprising: a transmitter system having first mode conditioners adapted to convert first single mode optical signals to respective multimode optical signals having respective spatial modes, and a mode multiplexer optically connected to the first mode conditioners and adapted to multiplex the multimode optical signals; a receiver system having a mode demultiplexer adapted to demultiplex the multiplexed multimode optical signals and having second mode conditioners optically coupled to the mode demultiplexer, the second mode conditioners adapted to convert the multimode optical signals into respective second single mode optical signals; and an optical link that optically connects the transmitter system and the receiver system, wherein the optical link comprises at least one rectangular-core optical fiber having a rectangular core with a short dimension and a long dimension, wherein the rectangular core optical fiber supports the spatial modes, and wherein the spatial modes are defined by only a single spatial mode in the short dimension and N spatial modes in the long dimension, wherein N >2 wherein the rectangular core comprising a relative refractive index $\Delta_1$, in the range from 0.2% to 1% at an operating wavelength $\lambda$=1550 nm and has a short dimension h in the range of 5 μm to 25 μm and a long dimension w in the range of 10 μm to 100 μm, subject to the condition that 2≤w/h ≤10, and wherein a cladding that surrounds the core has a relative refractive index $\Delta_2$=0.

2. The mode division multiplexing system according to claim 1, wherein the relative refractive index $\Delta_1$ is in the range from 0.3% to 0.6%.

3. The mode division multiplexing system according to claim 2, wherein the width w is in the range from 12 μm to 50 μm.

4. The mode division multiplexing system according to claim 2, wherein the cladding has a diameter in the range from 80 μm to 150 μm.

5. The mode division multiplexing system according to claim 1, wherein the core comprises Ge-doped SiO$_2$ glass and the cladding comprises undoped SiO$_2$ glass.

6. The mode division multiplexing system according to claim 1, wherein the at least one rectangular core supports N spatial modes, wherein 2≤N ≤10.

7. A mode division multiplexing system, comprising:
a) a transmitter system that generates multimode optical signals at an operating wavelength $\lambda$, with each multimode optical signal having a select spatial mode;
b) a receiver system adapted to receive and process the multimode optical signals; and
c) at least one rectangular-core optical fiber that optically connects the transmitter system and the receiver system, the at least one rectangular-core optical fiber comprising:
i) a rectangular core having a relative refractive index $\Delta_1$ in the range from 0.2% to 1% when the operating wavelength $\lambda$=1550 nm, a short dimension h in the range of 5 µm to 25 µm and a long dimension of width w in the range of 10 µm to 100 µm, subject to the condition that $2 \leq w/h \leq 10$;

ii) a cladding surrounding the core and having a relative refractive index $\Delta_2 = 0$; and iii) wherein the at least one rectangular-core optical fiber defines the select spatial modes of the multimode optical signals, and wherein the select spatial modes comprise only a single spatial mode in the short dimension and N spatial modes in the long dimension at the operating wavelength $\lambda$, wherein $N \geq 2$.

8. The mode division multiplexing system according to claim 7, wherein the relative refractive index $\Delta_1$ is in the range from 0.3% to 0.6%.

9. The mode division multiplexing system according to claim 7, wherein the cladding has a diameter in the range from 80 µm to 150 µm.

10. The mode division multiplexing system according to claim 7, wherein $2 \leq N \leq 10$.

11. The mode division multiplexing system according to claim 7, wherein the width w is in the range of 12 µm to 50 µm and the height h is in the range from 5 µm to 10 µm.

12. The mode division multiplexing system according to claim 7, wherein the core comprises Ge-doped $SiO_2$ glass and the cladding comprises undoped $SiO_2$ glass.

13. The mode division multiplexing system according to claim 7, wherein each select spatial mode defines a data channel.

14. A method of transmitting optical signals from a transmitter system to a receiver system, comprising:

at the transmitter system, converting first single mode optical signals into respective multimode optical signals, with each multimode optical signal having a select spatial mode as defined by a rectangular-core optical fiber having a rectangular core with a short dimension and a long dimension, wherein the rectangular-core optical fiber supports only a single spatial mode in the short dimension and N spatial modes in a long dimension, wherein $N \geq 2$;

transmitting the multimode optical signals over the rectangular-core optical fiber from the transmitter system to the receiver system;

performing at the receiver system mode division demultiplexing of the multimode optical signals and converting each multimode optical signal into a corresponding second single mode optical signal and then detecting the second single mode optical signals at respective receivers; and wherein the rectangular core has a relative refractive index $\Delta_1$ in the range from 0.2% to 1% at an operating wavelength $\lambda = 1550$ nm and has a short dimension h in the range of 5 µm to 25 µm and a long dimension w in the range of 10 µm to 100 µm, subject to the condition that $2 \leq w/h \leq 10$, and wherein a cladding that surrounds the core has a relative refractive index $\Delta_2 = 0$.

15. The method according to claim 14, wherein the relative refractive index $\Delta_1$ is in the range from 0.3% to 0.6%.

16. The method according to claim 14, wherein the cladding has a diameter in the range from 80 µm to 150 µm.

17. The method according to claim 14, wherein the long dimension w is in the range of 12 µm to 50 µm and the short dimension h is in the range from 5 µm to 10 µm.

18. The method according to claim 14, wherein the rectangular core comprises Ge-doped $SiO_2$ glass.

19. The method according to claim 14, wherein the rectangular-core optical fiber has a cutoff wavelength $\lambda_c$ of 1550 nm.

* * * * *

UNITED STATES PATENT AND TRADEMARK OFFICE
CERTIFICATE OF CORRECTION

PATENT NO. : 10,454,607 B2
APPLICATION NO. : 15/880674
DATED : October 22, 2019
INVENTOR(S) : Ming-Jun Li et al.

Page 1 of 1

It is certified that error appears in the above-identified patent and that said Letters Patent is hereby corrected as shown below:

In the Claims

In Column 10, Line 54, Claim 6, delete "$2 \leq N \leq 10$." and insert -- $2 \leq N \leq 10$. --, therefor.

In Column 11, Line 19, Claim 8, delete "$\Delta_l$" and insert -- $\Delta_1$ --, therefor.

In Column 11, Line 19, Claim 10, delete "$2 \leq N \leq 10$." and insert -- $2 \leq N \leq 10$. --, therefor.

Signed and Sealed this
Eighteenth Day of February, 2020

Andrei Iancu
*Director of the United States Patent and Trademark Office*